(12) United States Patent
Morrison

(10) Patent No.: US 7,001,082 B2
(45) Date of Patent: Feb. 21, 2006

(54) OPTICAL CONNECTOR

(76) Inventor: Brian D. Morrison, 22 Piazza La., Hopkinton, MA (US) 01748

( * ) Notice: Subject to any disclaimer, the term of this patent is extended or adjusted under 35 U.S.C. 154(b) by 0 days.

(21) Appl. No.: 10/373,283

(22) Filed: Feb. 24, 2003

(65) Prior Publication Data

US 2004/0052477 A1 Mar. 18, 2004

Related U.S. Application Data

(63) Continuation-in-part of application No. 10/039,044, filed on Jan. 3, 2002, now Pat. No. 6,600,972, which is a continuation of application No. 09/330,405, filed on Jun. 11, 1999, now Pat. No. 6,356,809.

(60) Provisional application No. 60/359,028, filed on Feb. 22, 2002, provisional application No. 60/429,962, filed on Nov. 29, 2002, and provisional application No. 60/358,914, filed on Feb. 22, 2002.

(51) Int. Cl.
*G02B 6/36* (2006.01)

(52) U.S. Cl. .......................................... 385/88; 385/53
(58) Field of Classification Search .................... 385/88, 385/89, 90–92, 53
See application file for complete search history.

(56) References Cited

U.S. PATENT DOCUMENTS 4,233,724 A    11/1980  Bowen et al.
4,307,934 A  * 12/1981  Palmer ......................... 385/93
4,325,137 A    4/1982   Yoshikazu
5,097,299 A    3/1992   Hunsperger et al.
5,936,263 A  * 8/1999   Hashizume .................. 257/98

FOREIGN PATENT DOCUMENTS

EP    0 971 250         1/2000
GB    2 239 104         6/1991
JP    2001-42174 A   *  2/2001

OTHER PUBLICATIONS

Copy of International Search Report from corresponding International Application No. PCT/US03/05249.

* cited by examiner

*Primary Examiner*—Akm Enayet Ullah
*Assistant Examiner*—Jennifer Doan

(57) ABSTRACT

A fiber optic connector having a plug portion with first and second ends, the first end receiving a first fiber optic cable(s) providing optical energy and a second fiber optic cable(s) for bi-directional optical data communications. The connector also includes a receptacle portion having first and second ends, the first end for mating with the second end of the plug portion, and the second end having a first pin(s) corresponding to the first fiber optic cable(s), and, a second pin(s) corresponding to the second fiber optic cable, where the receptacle portion further includes a first photodiode(s) corresponding to the first fiber optic cable(s) for converting the received optical energy digital electrical energy for output on the first pin(s), and, a second photodiode(s) corresponding to the second fiber optic cable(s) for converting received optical data communications to digital electrical data communications for output on the second pin(s).

13 Claims, 10 Drawing Sheets

OPTICAL CONNECTOR

CLAIM OF PRIORITY

This application claims priority to U.S. Ser. No. 60/359,028 filed on Feb. 22, 2002, the contents of which are incorporated herein in their entirety, and also claims priority to U.S. Ser. No. 60/358,914, filed on Feb. 22, 2002, the contents of which are incorporated herein by reference in their entirety, and claims priority to U.S. Ser. No. 60/429,962 filed on Nov. 29, 2002, the contents of which are incorporated herein by reference in their entirety, and this application is a continuation-in-part of U.S. Ser. No. 10/039,044 entitled "Electro-statically Shielded Processing Module," filed on Jan. 3, 2002 now U.S. Pat. No. 6,600,972, the contents of which are incorporated herein by reference in their entirety, where U.S. Ser. No. 10/039,044 is a continuation of U.S. Ser. No. 09/330,405 entitled "Electro-statically Shielded Processing Module," filed on Jun. 11, 1999, and now U.S. Pat. No. 6,356,809, which names Brian D. Morrison and Paul A. Connolly as inventors, the contents of which are also incorporated herein by reference in their entirety.

CROSS-REFERENCE TO RELATED APPLICATIONS

This patent application is co-pending with a related patent application entitled "Optical Ring Architecture," by the same inventor as this patent application, and filed on the same day as this application (Feb. 24, 2003), the contents of which are incorporated herein in their entirety.

BACKGROUND (1) Field

The disclosed methods and systems relate to an optical connector.

(2) Description of Relevant Art

In fiber optic systems, such as fiber communications systems, light acts as the information carrier and is propagated by internal reflection through a transparent optical waveguide. Such signal paths are often used to transmit information between electrical systems, and therefore electro-optic modulators can be used to convert electrical signals to light, and opto-electric demodulators can be used to convert the light to electrical signals. Fiber optic signal paths and/or communications data links can be used, for example, when a shielded twisted pair or a coaxial cable may be undesirable due to performance criteria such as data rate, transmit length, electrical interference or noise, crosstalk, etc.

A fiber optic connector can thus mate an optical fiber mechanically and optically to other optical fibers and/or to a terminal or signal port of apparatus and equipment at the ends of the fiber optic signal paths. Fiber optic connectors are fabricated in a wide range of types and sizes for different applications. One fiber optic connector is a so-called fiber optic "SMA" connector that conforms to certain optical characteristics such as insertion loss characteristics, and standard mechanical characteristics such as thread sizes and diameters of connector mating regions. It can thus be difficult to ensure the mating integrity of fiber optic SMA connectors. Furthermore, in systems that include multiple SMA connectors that should be coupled to one of multiple different fiber optic cables, it can be difficult to determine the corresponding fiber optic cables and connectors because standard SMA fiber optic connectors generally do not include means, such as a key, to prevent mating with an incorrect SMA compatible receptacle.

Vibration forces can also loosen SMA connectors to result in intermittent attenuation or loss of the signal propagating through the connector. A safety wire can be used such that the fiber SMA connector includes an opening and the safety wire can be threaded through the SMA connector opening and through an opening in a mating receptacle or mounting structure to which the connector can be attached. The safety wire can be twisted and/or wound to prevent the SMA connector from loosening from the receptacle.

Some non-SMA type single fiber connectors include a ratchet mechanism to prevent the connector from separating from its mounting structure and also include an alignment key to allow the connector to be coupled to a receptacle having a mating keyhole. These connectors are not compatible with mechanical and optical characteristics of standard fiber optic SMA connectors, are relatively expensive, and typically may not be used in more than one application or product.

U.S. Pat. No. 6,356,809 describes one electro-optical system that is a fuel measuring system that includes a module adapted for mounting to a fuel storage tank with an electrostatically shielded enclosure. A processor element in the enclosure can be adapted for coupling to a fuel sensor in the tank. A communication interface is provided for coupling data through the enclosure between the processor and a processor external to the package through a dielectric transmission media passing through the enclosure. A power supply for the processor element is also disposed in the enclosure and is adapted to generate power for the processing element in response to optical input energy from a source external to the enclosure. An energy interface can couple the optical energy through dielectric transmission media passing through the enclosure. With such an arrangement, both data to the electro-statically shielded processor and energy to the electro-statically shielded power supply are coupled to the electro-statically shielded enclosure through dielectric media. Accordingly, the fuel tank can be electrically isolated from electrical disturbances external to the enclosure and the conductive wires that transmit the electrical signals, where such electrical disturbances can cause a hazardous condition in the fuel tank.

The communications interface to a measurement/processor system, such as the aforementioned electrostatically shielded enclosure, can include means for accepting the one or more fiber optic connections for data and energy coupling as provided herein. Existing connectors provide connection for a single optical fiber, hence requiring multiple connections for data and energy. Further numbers of connectors can be used to provide redundancy of data and/or energy. Additionally, the measurement/processor systems are often specifically configured with measurement devices to perform a conversion from optical to electrical energy.

SUMMARY

The disclosed methods and systems include a fiber optic connector that includes a plug portion having a first end and a second end, where the first end receives a first fiber optic cable(s) providing optical energy, and/or a second fiber optic cable(s) for bi-directional optical data communications. The connector also includes a receptacle portion having a first end and a second end, the first end for mating with the second end of the plug portion, and the second end having a first pin(s) corresponding to the first fiber optic cable(s), and a second pin(s) corresponding to the second fiber optic cable(s). The receptacle portion further includes a first photodiode(s) corresponding to the first fiber optic cable(s) for converting the received optical energy to analog/digital electrical energy for output on the first pin(s), and, a second photodiode(s) corresponding to the second fiber optic cable(s) for converting received optical digital communications data to analog/digital electrical signals for output on the second pin(s). The second photodiode(s) can also receive analog and/or digital electrical communications signal data as input from the second pin(s), and convert the received analog and/or digital electrical communications data to optical digital communications data for transmission to the second fiber optic cable(s).

The plug portion can include one or more first ferrules for communicating optical energy from the first fiber optic cable(s) to the first photodiode(s) when the plug portion is mated to the receptacle portion. The first ferrule(s) can include a first end and a second end, where the first end can be mated to the first fiber optic cable(s), and the second end can be positioned between approximately one and approximately three millimeters from the first photodiode(s). The first ferrule(s) can be positioned to provide a signal distribution based on the at least one first photodiode. The first photodiode(s) can be associated with a microprocessor with instructions for causing the microprocessor to monitor the optical energy received from the first fiber optic cable(s).

The plug portion can include one or more second ferrules for communicating optical digital communications data from the second fiber optic cable(s) to the second photodiode(s) when the plug portion is mated to the receptacle portion. The second ferrule(s) can include a first end and a second end, where the first end is mated to the second fiber optic cable(s), and the second end can be positioned between approximately one and approximately three millimeters from the second photodiode(s). The second ferrule(s) can be positioned to provide a signal distribution based on the at least one second photodiode. The second photodiode(s) can be associated with a microprocessor having instructions for causing the microprocessor to convert the optical data communications received from the at least one second fiber optic cable to digital electrical data communications.

In one embodiment, the first pin(s) can be connected to an electrical power input to a processor module, and the first fiber optic cable(s) can be connected to a laser power diode(s) and/or amplifier(s). In an embodiment, the second pin(s) can be connected to an electrical data communications input/output to a processor module, and the second fiber optic cable(s) can be connected to an optical communications network. The optical communications network can employ at least one of an Ethernet and a Fieldbus protocol, and can include one or more processor modules connected in a daisy chain by the second fiber optic cables(s).

DESCRIPTION

To provide an overall understanding, certain illustrative embodiments will now be described; however, it will be understood by one of ordinary skill in the art that the systems and methods described herein can be adapted and modified to provide systems and methods for other suitable applications and that other additions and modifications can be made without departing from the scope of the systems and methods described herein.

Unless otherwise specified, the illustrated embodiments can be understood as providing exemplary features of varying detail of certain embodiments, and therefore, unless otherwise specified, features, components, modules, and/or aspects of the illustrations can be otherwise combined, separated, interchanged, and/or rearranged without departing from the disclosed systems or methods. Additionally, the shapes and sizes of components are also exemplary and unless otherwise specified, can be altered without affecting the disclosed systems or methods.

As provided herein, a fiber optic cable or fiber cable can include a fiber optic core (e.g., glass) surrounded by a cladding layer and/or shielding.

Figure 1:
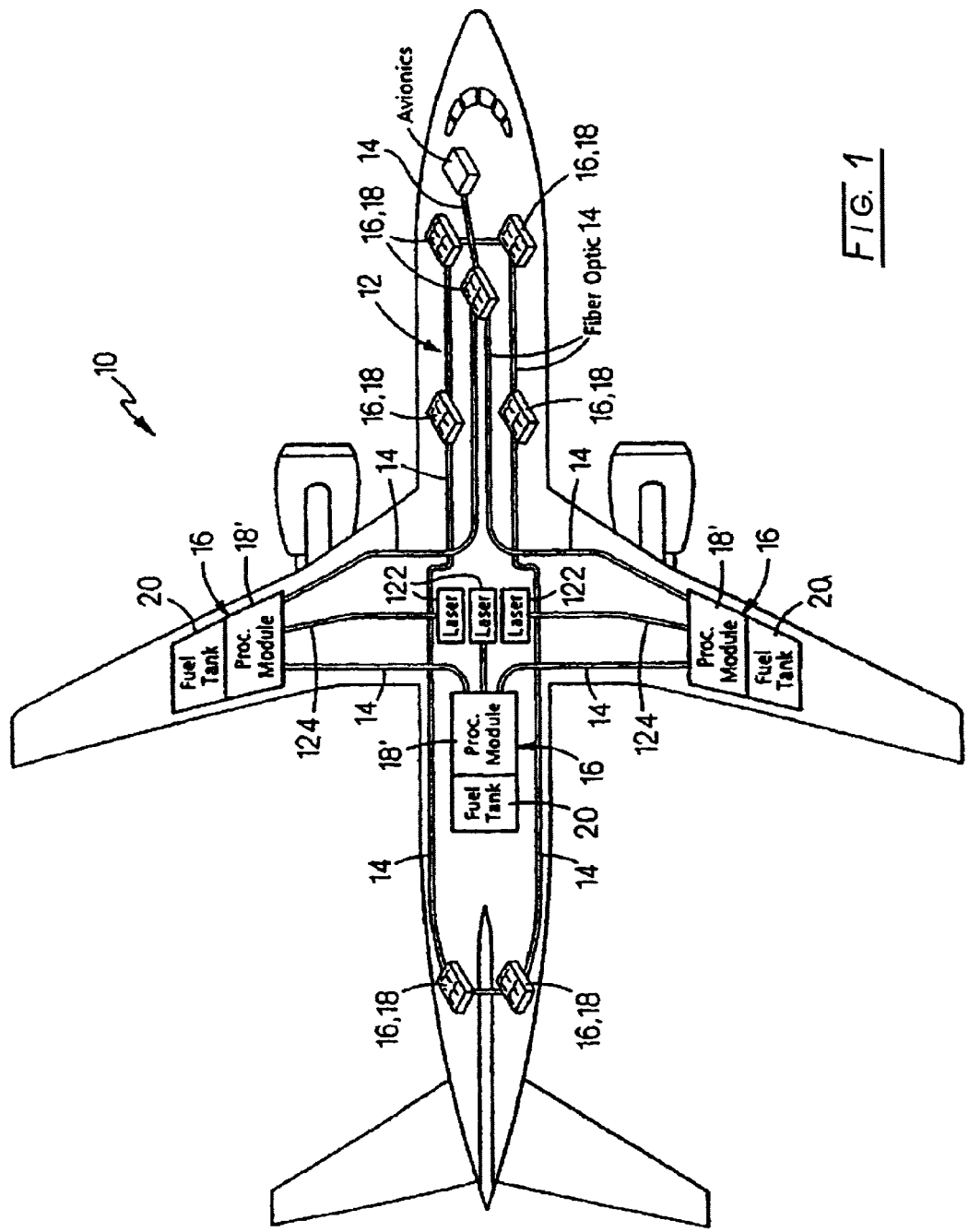
FIG. 1 is a schematic representation of one processor module as provided herein, and includes a portion of one distributed control system for monitoring fuel tanks in an aircraft.
Figure 2:
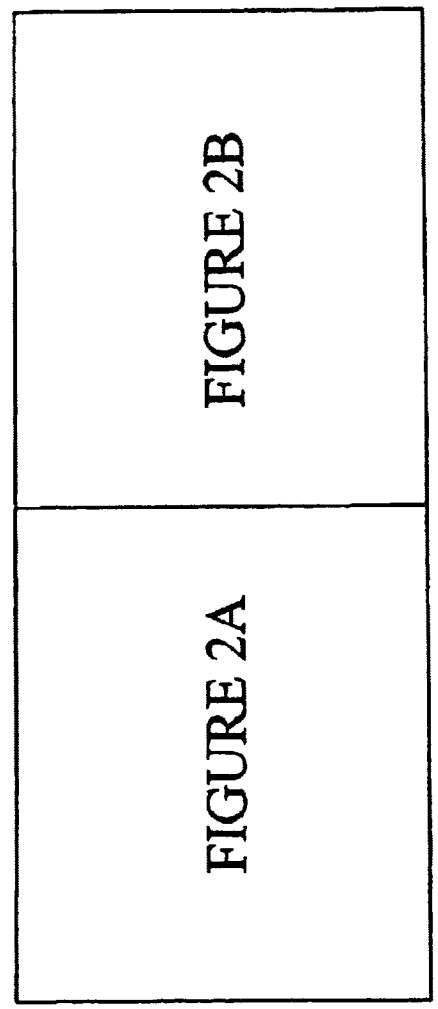
FIG. 2 is a fuel measuring portion of a control system that can be utilized for a system according to FIG. 1.

Referring now to FIGS. 1 and 2, and according to an exemplary system as provided in U.S. Pat. No. 6,356,809, an aircraft 10 can include a distributed control system 12 for sensing and control across fiber optic communication media 14 interconnecting intelligent nodes 16. The intelligent nodes 16 can include a digital communication processor and a transceiver, hereinafter sometimes referred to as a processing module 18, that can operate autonomously in relation to modules 18 at other nodes 16. A transceiver in the module 18 can interface with the fiber optic communication media 14. The fiber optic communication media 14 can include bi-directional serial data busses, which can be, for example, fiber optic cables.

To increase fault tolerance, two, three, four, or more redundant such bi-directional data buses 14 can be employed. Redundancy can also be employed in certain intelligent nodes 16 performing activities such as sensor/actuator activities in an aircraft control system. The coupling of the nodes 16 to the serial data buses 14 can be accomplished by transceivers within the modules 18 and a transceiver can be connected to a digital control and communication processor (DCCP) 28 within the module 18, where the DCCP 28 can otherwise be understood to be a microprocessor with instructions for causing the microprocessor to act and/or perform as provided herein. A transceiver and DCCP 28 combination can be referred to herein as a processing element or module. By distributing the system intelligence to multiple nodes 16, and as additionally and optionally, as illustrated, every node, network communications can be reduced, autonomy for failure-recovery can be enhanced, and reliability can be improved.

FIG. 2 thus shows a fuel tank measurement module for a system 12 such as the system of FIG. 1, although other sensors and/or measurement systems can be employed without departing from the scope of the disclosed methods and systems, and references herein to a fuel tank sensor can be understood to be inclusive of references to a measurement device and/or sensor. The processing modules 18 can be incorporated into or otherwise represent a tank wall processor module 100 such that the tank wall processor module 100 can monitor fuel in corresponding fuel tanks 20 of the aircraft 10. The distributed local intelligent nodes 16, for example, can sense and/or control physical parameters of fuel sensors 86 and employ the communications provided by the serial buses 14.

Figure 3:
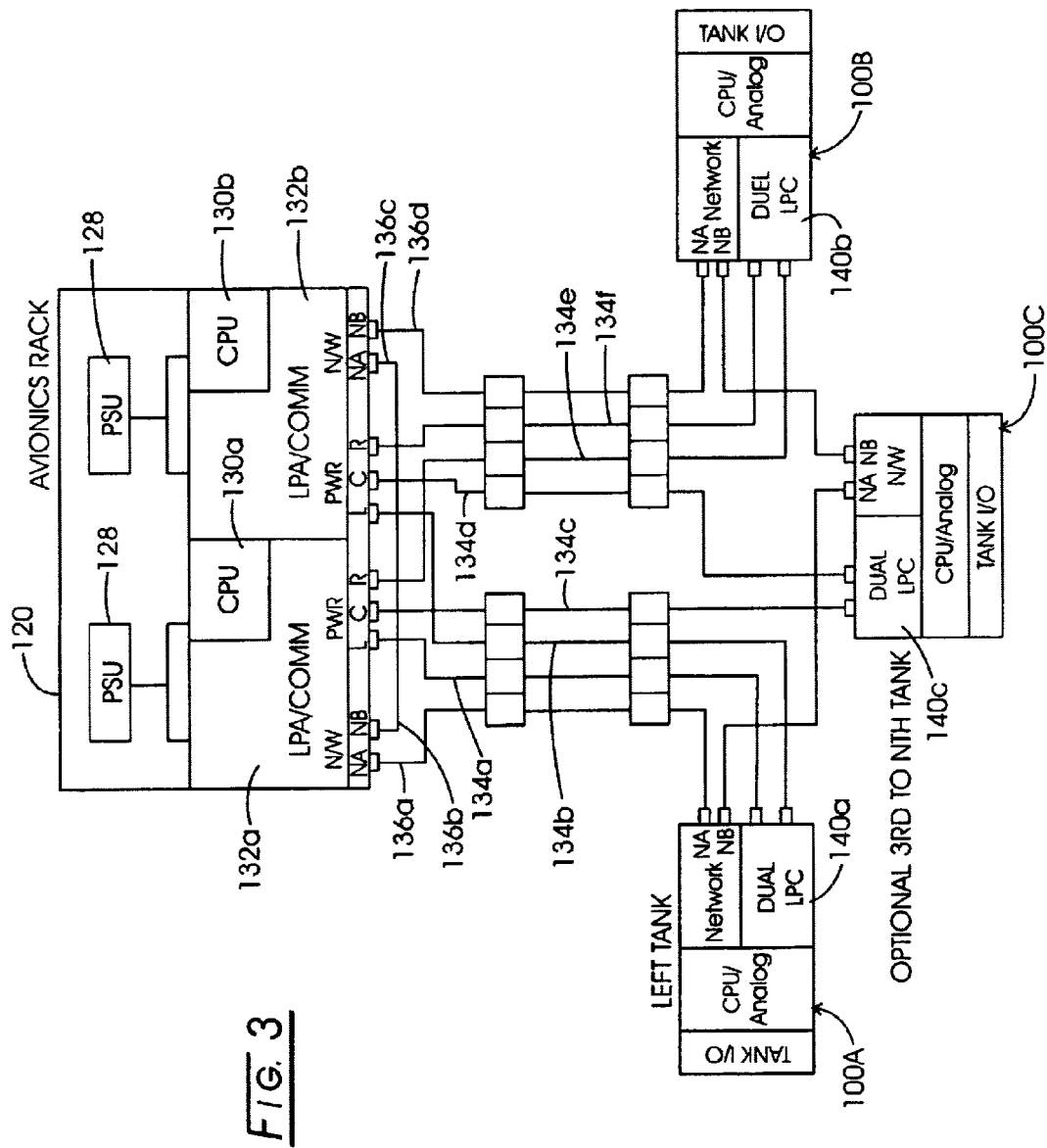
FIG. 3 is a system architecture for one system that can be employed according to FIGS. 1 and 2.

Referring now to FIG. 3, an arrangement is shown for an aircraft 10 having "left", "right", and "center" fuel tanks (not shown) with corresponding left 100a, right 100b, and center 100c tank wall processor modules. Those of ordinary skill will recognize that the FIG. 3 system is merely illustrative of one embodiment and/or a portion of one embodiment that can include three (3) fuel tanks, and that the disclosed methods and systems can be extended and/or reduced to another number of fuel tanks. Similarly, the names of "left," "center," and "right" are merely for convenience.

In the FIG. 3 system, the tank wall processor modules 100a–c can be mounted to the respective fuel tanks 20, and thus the tank wall processor modules 100a–c may be physically mounted to the fuel tank wall, in proximity to the fuel tank wall, and/or otherwise in communications with the fuel tank wall. As shown in FIG. 1, and with reference to FIGS. 2 and 3, avionics associated with aircraft can include electronics (see FIG. 1, and "avionics rack," FIG. 3) 120 that can be located, for example, in an avionics bay or another location, where the avionics rack can include one or more power supply units 128 for providing power for one or more control processor units (CPUs) 130a–b and/or one or more laser power diode/amplifiers 132a–b. The laser power diode/amplifiers 132a–b can include and/or interface to the bi-directional fiber optic cables 14 connecting the avionics electronics 120 to the tank wall processor modules 100a–c at the fuel tanks 20.

In the FIG. 3 embodiment that represents an embodiment having three fuel tanks 20, the laser power diode/amplifiers 132a–b can interface to three (or more) fiber optic cables 134a–c, 134d–f, respectively, where a corresponding one of such three fiber optic cables 134a–c from the laser power diode/amplifiers 132a–b can provide an optical power link between the respective laser power diode/amplifiers 132a–b and one of the tank wall processor modules 100a–c. Such optical power link from the laser power diode/amplifiers 132a–b to the tank wall processors 100a–c can be allowed to transfer energy to a laser power converter module 140a–c of the respective tank wall processors 100a–c such that the laser power converter modules 140a–c may receive the energy from a laser power diode/amplifier 132a–b and convert such received optical laser energy to electrical energy to provide power to the respective components of the tank wall processor module 100a–c. Accordingly, the FIG. 3 embodiment which allows an optical power link 134a–d, 134d–f between at least two laser power diode/amplifiers to a respective tank wall processor 100a–c allows for power redundancy and decreased faults from power failures. Additionally and/or optionally, the dual optical power connections may allow for an increased electrical energy/power to the processor module 100a–c, for example, by providing parallel power inputs that can be combined by the tank wall processor module 100a–c.

With continuing reference to FIGS. 2 and 3, the illustrative embodiment of the tank wall processors 100a–c include a digital control and communication processor (DCCP) 28 that includes a communications port 54 for communicating network and other data (e.g., sensors and control device data) between one or more processors in the tank wall processor modules 100a–c and the avionics electronics 120. For example, at least some of the communicated data can be based on measurements from the fuel tank 20.

Accordingly, in the embodiment of FIGS. 2 and 3, a signal converter 102 within the respective tank wall processor modules 100a–c can receive signals and/or data based on sensors in the fuel tank 20 and convert the signals/data for the DCCP 28. In one embodiment, the signal converter 102 can convert an analog signal to a digital signal, and/or the signal converter 102 can otherwise condition the signals/data (e.g., filter, amplify, etc.) for the DCCP 28 where the received signals can be analog or digital. The DCCP 28 can cause the data to be transmitted to the avionics electronics 120 via one or more communications ports 54, where such data communications can employ one or more networking protocols for facilitating a digital transmission of data. The communications port 54 can thus include a conversion from electrical energy to optical energy.

As shown in the FIG. 3 embodiment, the avionics electronics 120 can include one or more (e.g., two illustrated) network channels 136a–b, 136c–d (shown in FIG. 1 as 14) that can be connected in the daisy chain and/or fiber optic ring configuration that can include the network interfaces 132a–b and the three tank wall processor modules 100a–c. Accordingly, as shown in FIG. 3, a first network interface 132a can communicate directly to the left tank wall processor module 100a via a first communicative link 136a, and/or the first network interface may communicate to the left tank wall processor module 100a via a second communicative link 136b that can include communications to a second network interface's 132b first communicative link 136c, the second network interface's 132b second communicative link 136d, and thereafter communications to the right tank wall processor module 10b, center tank wall processor module 100c, and thereafter to the left tank wall processor module 110a. In the illustrated system, the fiber communications data link can employ a Fieldbus (e.g., LonWorks) or Ethernet protocol, although those of ordinary skill in the art will recognize that the methods and systems are not limited to such a protocol, and that other protocols that may be proprietary, standard, or otherwise known, can be used.

Figure 4:
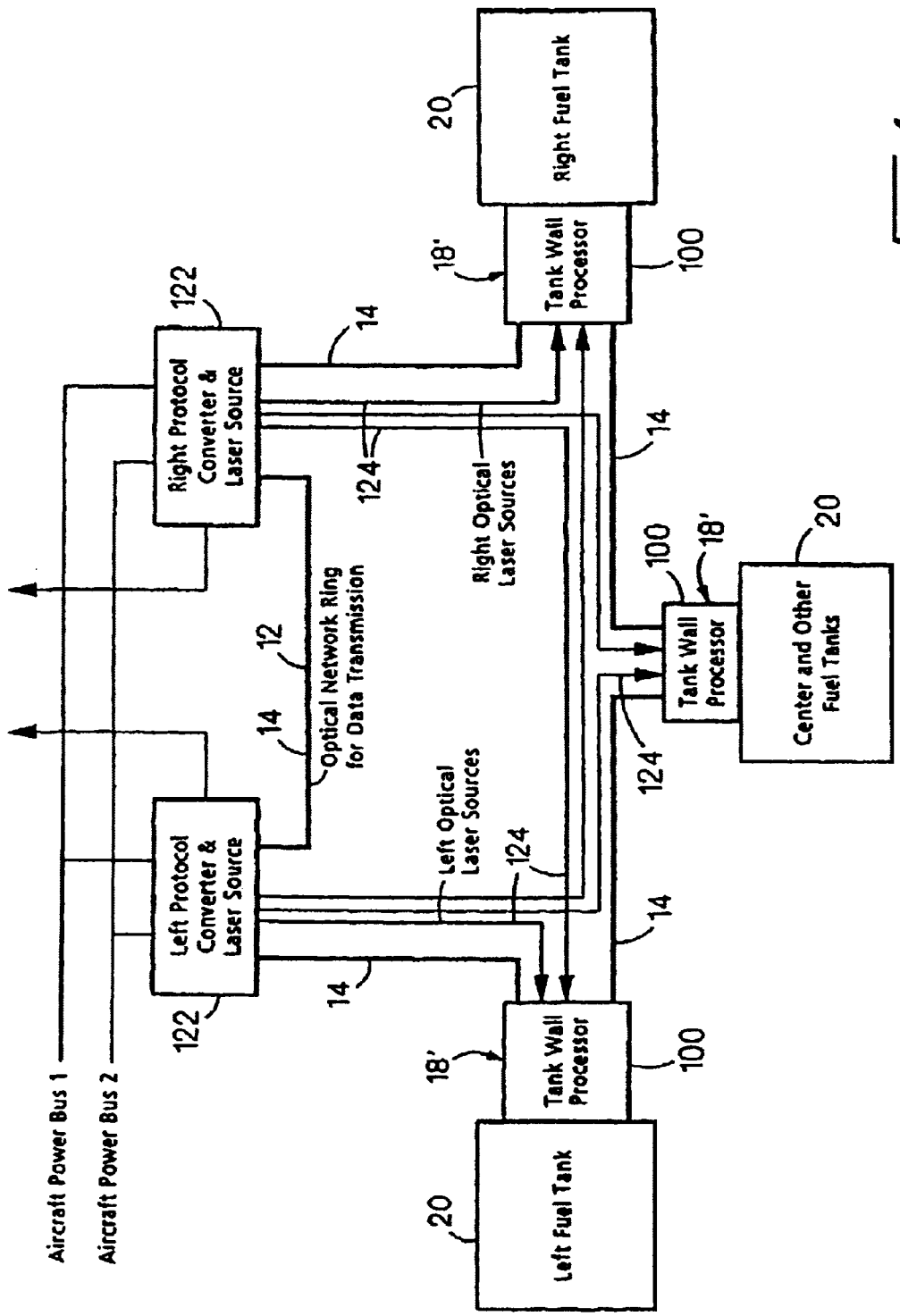
FIG. 4 is another embodiment of a system for providing distributed control.

FIG. 4 provides another illustrative embodiment of the methods and systems illustrated in FIG. 3.

For a system according to FIGS. 3 and 4, accordingly, the respective tank wall processors 100a–c can interface to the aforementioned communicative links 134d–f, 136a–d using one or more optical connectors. For the illustrated system, two optical connectors can be provided for a tank wall processor module 100a–c, where, with reference to FIG. 6, an optical connector can facilitate one or more optical power fibers/receivers 156a, b for communicating optical energy from the laser power sources 132a, b, and/or a bi-directional data link optical fiber 156c for facilitating communications data, including but not limited to an architecture that includes the network communications ring as provided previously herein.

Figure 5:
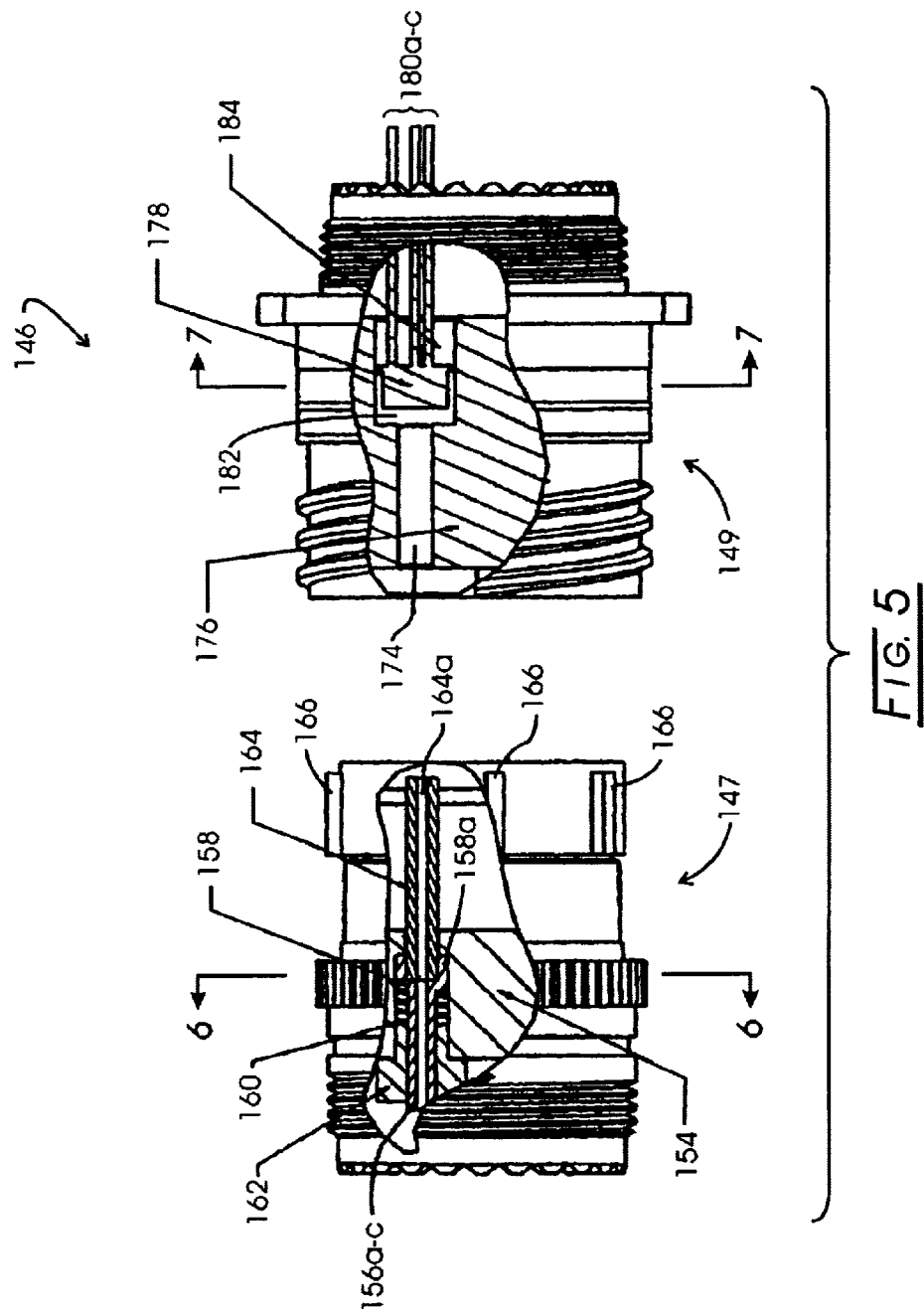
FIG. 5 is a partial cross sectional view of an optical connector.

Referring now to FIG. 5, there is a cross-sectional view of at least a portion of one optical connector (OC) 146 according to the disclosed methods and systems. The illustrated OC 146 includes a plug portion 147 and a receptacle portion 149, with the illustrated plug portion 147 adapted to be inserted within the receptacle portion 149, although such configuration is optional. With additional reference to FIG. 6 that shows a cross-sectional view of plug portion 147 at line 6—6 of FIG. 5, the plug portion 147 can include a plug bore 152 extending through at least a part of plug portion 147. An insert section 154, which can be composed of metal or another material suitable for the embodiment, can be disposed within the plug bore 152 and the insert section 154 can include receptacles for accepting at least one or more fiber optic cables that can include fiber optic bores 156a–c (e.g., glass core), surrounded by a cladding and/or shielding layer 158. In one embodiment, the FIG. 6 insert section 154 can be held securely within the plug bore 152 to prevent movement or rotation of the insert 154 within the plug bore 152. The insert section 154 can be secured by one or more known methods, including but not limited to press fitting, adhesing, tacking, bolting, fastening, or other means as can be known in the art.

The number of fiber optic cable receptacles within the insert section 154 for receiving fiber optic cables/bores 156a–c can vary based on the embodiment. The illustrated embodiment includes three fiber optic cables/pores 156a–c that can correspond to two optical connections to two different laser power diode/amplifiers 134a–f and one bi-directional data link 14, 136a–d, however in other embodiments, four fiber optical cables/bores 156a–c may be used that can correspond to two optical connections to two different laser power diode/amplifiers 134a–f and two bi-directional data links 14, 136a–d. In a system such as provided in FIGS. 3 and 4, for example, two OC's 146 can be used where a first OC 146 can be interfaced to a tank wall processor module 100 and the OC 146 can include a first network connection (e.g. bi-directional data link) to a first device in the network daisy chain, a second network connection (e.g., bi-directional data link) to a second device in the network daisy chain, with two optical power inputs from first and second laser power diode/amplifiers 132a–b. Further, a tank wall processor module 100 can be configured to accept a second OC 146 that can provide redundancy in the network and power connections. In one embodiment, a tank wall processor module 100 can accept a four-way connector 146 that can provide two bi-directional data/communications ports having respective connections to provide the aforementioned daisy-chain architecture. For example, the OC 146 can interface to a tank wall processor module 100 and can include a first bi-directional communications data link/network connection to a first device in the network daisy chain, a second network bi-directional communications data/network link or connection to a second device in the network daisy chain, and two optical power inputs from a first and a second laser power diode/amplifier 132a–b. Accordingly, the number and type of fiber optic cables that can be accommodated in an OC 146 can be varied based on the embodiment. Further, although the illustrated embodiment of FIG. 6 indicates that the fiber optic bores 156a–c are uniformly distributed throughout the plug bore 152, such arrangement is merely illustrative of one configuration and other arrangements may be used based on the embodiment.

Referring back to FIG. 5, a collar 158 (e.g., cladding and/or shielding) can be disposed about the fiber optic bores 156a–c where the collar 158 can include a widened portion 158a at an end of the respective fiber optic bores 156a–c such that the widened portion 158a can accept a ferrule 164 that may be composed of ceramic or another suitable material. The ferrule 164 can have a first end and a second end and can be secured in the plug portion 147 by the insert section 154. The ferrule 164 can be adapted to include a fiber core 164a that can extend the length of the ferrule 164 from the first end to the second end of the ferrule 164, such that the fiber core 164a at a first end can be aligned with a respective fiber optic bore 156a–c when accepted by the widened portion 158a of the collar 158. As depicted in the illustrative embodiments, the ferrule 165 can thus extend beyond the insert section 154 and through the plug portion 147 in a direction opposite the fiber optic bores 156a–c. The plug portion's insert section receptacles can thus have a first section having a first width for accepting the widened portion 158a of the collar/shielding 158, where such first width extends away from the receptacle portion 149, and the insert section receptacles can include a second section having a second width that extends towards the receptacle portion 149 and is sized in width and length to secure at least a portion of the ferrule 164 in position for connecting with the widened portion 158a of a collar, and as provided herein, for mating with the receptacle portion 149.

As shown in FIG. 5, a spring 160 can be disposed in the first section of the insert section 154 after the widened portion 158a of the collar 158 of the fiber optic bore 156a–c is secured about the first end of the ferrule 164. As FIG. 5 indicates, the spring 160 may be placed in contact with the widened portion 158a of the collar 158a distal from the receptacle portion 149. A retaining nut 162 can be threaded into threads that may be formed within the receptacles of the first section of the insert section 154 such that the retaining nut 162 may compress the spring 160 and secure the widened portion 158a of the collar 158 to maintain alignment between the respective fiber optic bore 156a–c and the fiber core 164a of the ferrule 164. Other methods of securing the retaining nut 162 can be used (e.g., notch, etc.)

Figure 7:
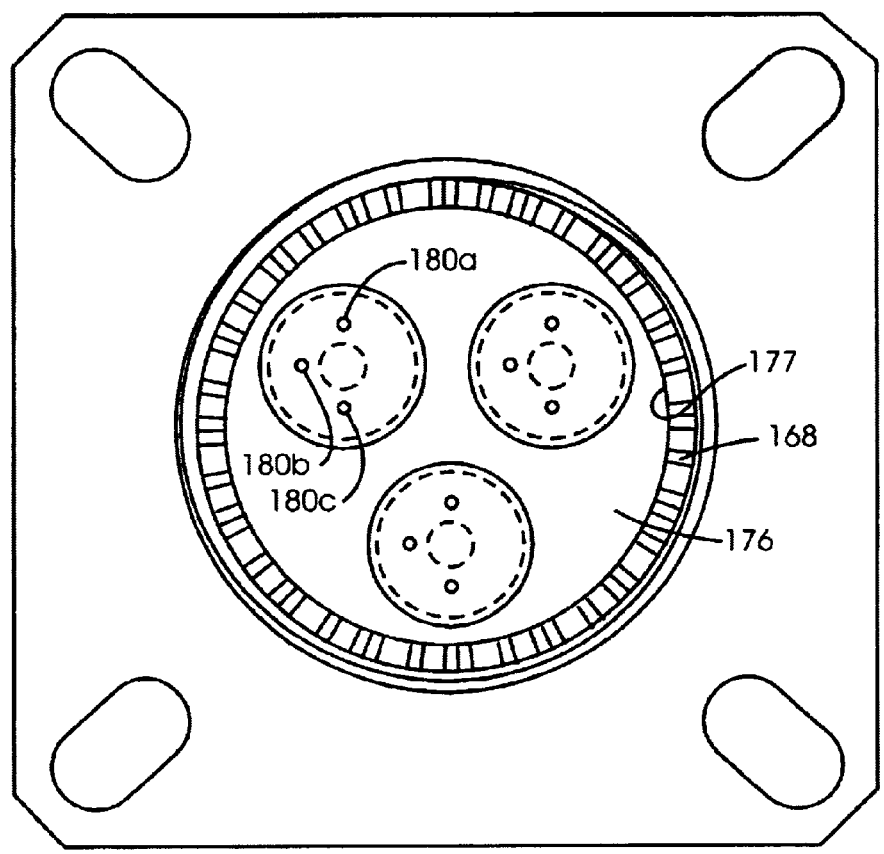
FIG. 7 is a cross-sectional view of a receptacle portion of the optical connector of FIG. 5, taken at line 7—7 of FIG. 5; and, FIG. 8 is a view of the mated plug and receptacle portions of FIG. 5.

FIG. 7 shows a cross-sectional view of receptacle portion 149 of the OC 146 taken at line 7—7 of FIG. 5. As FIGS. 5 and 7 indicate, the plug portion 147 can include bosses 166 that can be spaced about the outer circumference of plug portion 147 to mate with matching slots 168 within the outer circumference the receptacle portion 149 when the plug portion 147 is inserted into receptacle portion 147. As is shown and known in the art, the mating of the two portions 147, 149 can be sealed using O-rings and/or other sealing means.

As also shown in FIGS. 5 and 7, the receptacle portion 149 includes ferrule receptacles 174 for receiving the second end of the ferrule 164, where the ferrule 164 can be inserted end of the ferrule receptacle 174 when the plug portion 147 is mated to the receptacle portion 149 as provided previously herein. The illustrated ferrule receptacle 174 can be secured by an insert portion 176 of the receptacle portion 149, where the insert portion 176 can be metal or another material, can have one or more bores for such ferrule receptacle(s) 174, and can be secured to an inner bore 177 of the receptacle portion 149.

The ferrule receptacle 174 can be arranged based on the ferrule 164 of the plug portion 147 such that when the plug portion 147 mates with the receptacle portion 149, the second end of the ferrule 164 can extend to the second end of the ferrule receptacle 174, although some embodiments may allow a ferrule to extend beyond a ferrule receptacle 174 or less than the full length of the ferrule receptacle 174.

Figure 6:
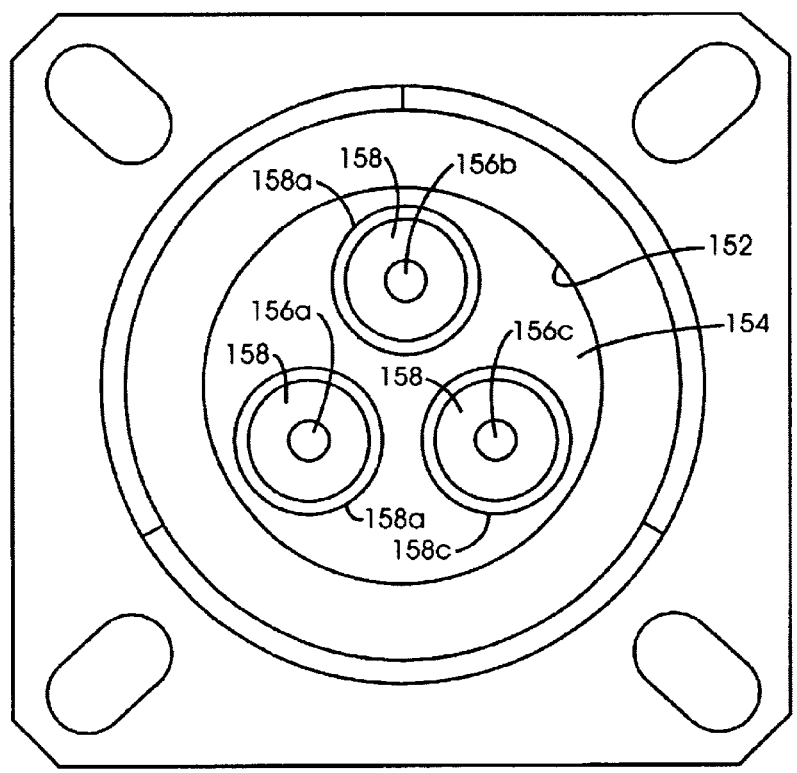
FIG. 6 is a cross-sectional view of a plug portion of the optical connector of FIG. 5, taken at line 6—6 of FIG. 5.
Figure 8:
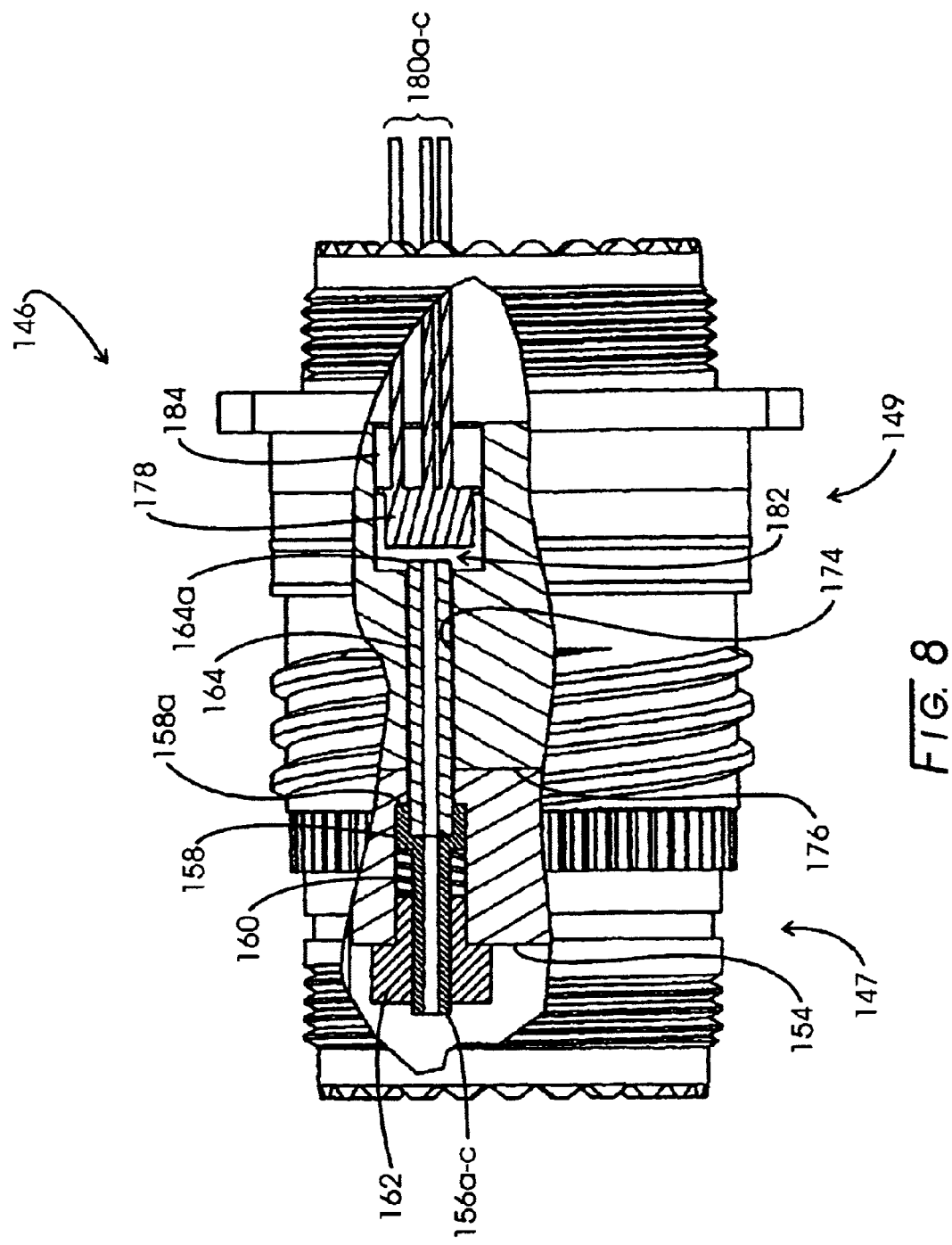

The second end of the illustrated ferrule receptacle 174 can allow for the transmission of light through the ferrule fiber core 164a and to the second end of the ferrule receptacle 174 such that light transmitted through the fiber core 164a can be detected by a photodiode 178 that can be for example, a three-pin 180a–c photodiode as illustrated in FIGS. 6–8, but may be a photodiode having a different number of pins. As is known in the art, such detected light can be converted by the photodiode to electrical energy for output on one or more of the photodiode pins 180a–c.

The illustrated embodiment provides an air gap 182 between the photodiode 178 and the second end of the ferrule to provide a signal spreading/distribution and/or attenuation in accordance with the embodiment. Such signal distribution can thus be based on the expected optical energy and characteristics of the photodiode 178, and may also consider factors such as the diffraction of the light and the numerical aperture of the fiber optic cable. In some embodiments, the air gap 182 can be on the order of approximately one millimeter to approximately three millimeters, although such example is provided for illustration and not limitation. The photodiode 178 can be secured by a potting housing 184. The potting housing 184 may thus serve to align the photodiode 178 with the ferrule receptacle 174 and/or ferrule 164 and/or ferrule fiber core 164a and further to maintain a desired spacing between the same.

FIG. 8 provides an illustration of the mated plug 147 and receptacle 149 portions for a single fiber optic bore 156a–c.

The illustrated photodiode 178 can thus provide the receptacle portion 149 with an "active" lens in that the sensed optical energy from a laser power diode/amplifier 132a, b, for example, can be converted by the photodiode 178 to analog and/or digital electrical energy, where such sensed optical energy/power can represent a DC power level to be provided to the processor module 100 for powering components (e.g., microprocessors, etc.) and/or sensors (e.g., fuel tank, camera, motion sensor, etc.) of the processor module 100. Accordingly, the photodiode 178 can be associated with a microprocessor that can reside in the processor module 100 where the microprocessor (e.g., ASIC) can have instructions to monitor the conversion of an optical power input signal (to the photodiode from the optical fiber) power amount. In an illustrative embodiment, the photodiode 178 can be a TO-46 Laser Power Converter, although such example is provided merely for illustration and not limitation.

For fiber optic cables that communicate and/or provide digital optical data communications data to the photodiode 178, the photodiode 178 can convert such received optical digital communications data to analog and/or digital data that can represent the optical digital communications data, and provide such analog and/or digital data via the pins 180a–c to a processor module 100. The processor module 100 may convert the received data to digital data. Accordingly, a photodiode 178 receiving optical digital communications data from the fiber optic cable can be associated with a microprocessor (e.g., ASIC) located in the tank wall processor 100 for processing the received digital communications data. Further, as provided herein, a photodiode 178 can provide for a bi-directional data communications channel and/or datalink, and thus can receive analog and/or digital signals on the pins 180a–c, the analog and/or digital signals representing digital communications data from the processor module 100 and/or component(s) thereof, and convert such analog and/or digital signals to optical digital communications network data for transmission on the bi-directional optical fiber communications channel.

Figure 2A:
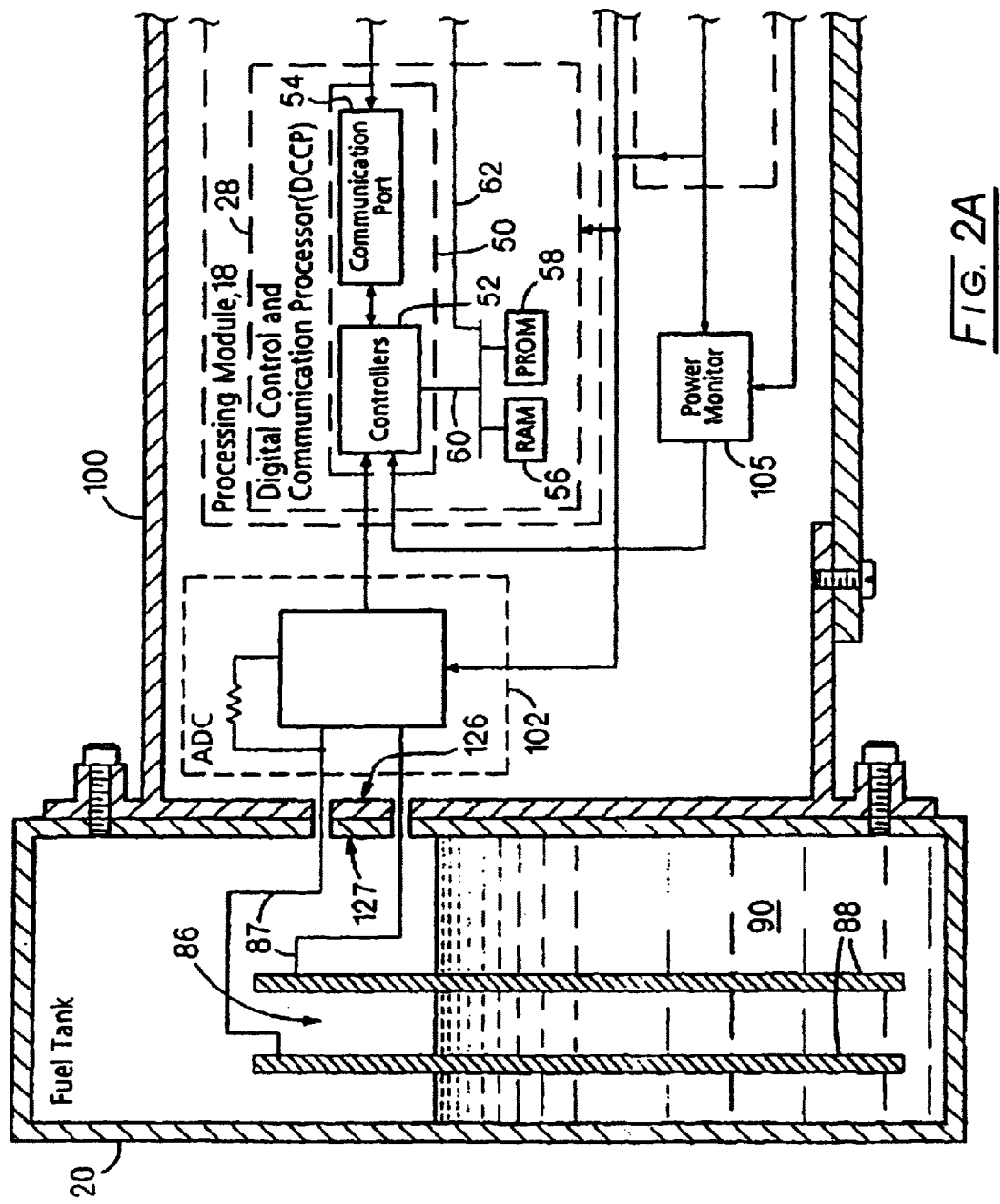
Figure 2B:
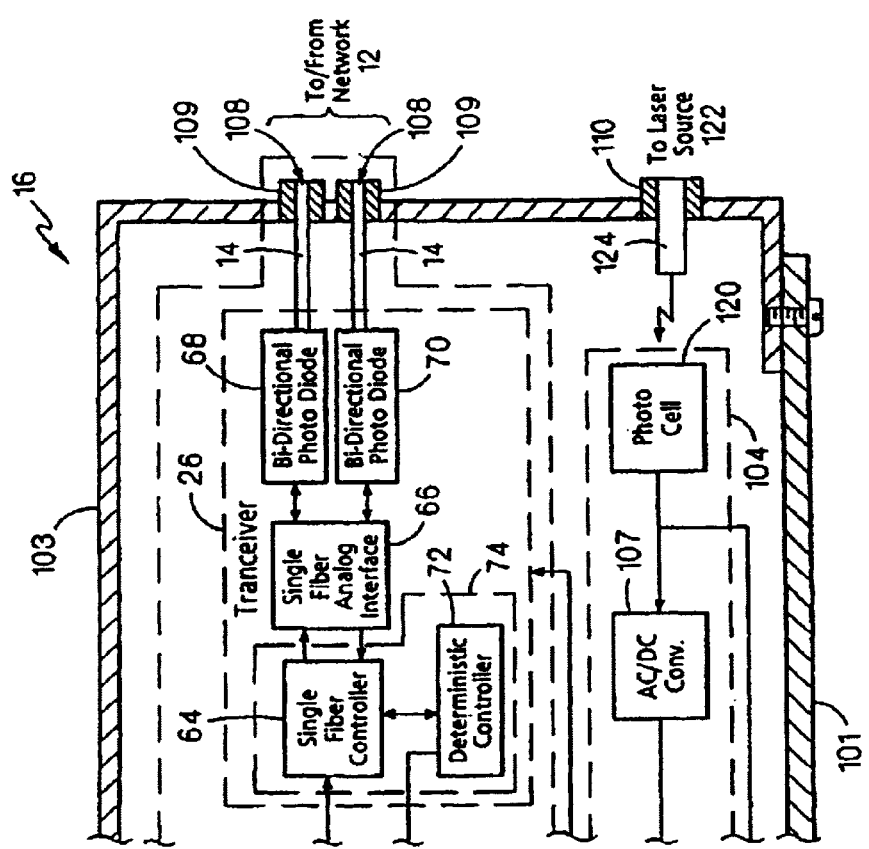

Those of ordinary skill in the art will recognize that the tank wall processor 100 embodiment of FIGS. 2A and 2B are representative of an embodiment that may not employ the OC 146 of FIGS. 6–8, as such tank wall processor module 100 includes photodiodes (see FIG. 2A, 68, 70, 120) that are internal to the tank wall processor 100. Accordingly, an embodiment according to FIG. 2A that employs the optical connectors of FIGS. 6–8 may dispose of the internal, illustrated tank wall processor module photodiodes 68, 70, 120 of FIG. 2A.

What has thus been described is a fiber optic connector to a processor module, where the fiber optic connector includes a plug portion and a receptacle portion for mating to the plug portion. The plug portion can receive at least one first optical fiber and/or at least one second optical fiber. The first optical fibers can be configured to transmit energy for providing power to the processor module. The second optical fibers can be configured for providing bi-directional data communications to the processor module. Accordingly, the receptacle portion can include photodiodes for receiving optical energy from the first optical fibers, and converting such optical energy to an analog and/or digital signal that can represent a DC electrical power for the processor module. The receptacle portion can also include a photodiode for receiving optical digital communications data from the second optical fibers, and converting such optical communications data to analog and/or digital electrical signal data that represents the optical digital data for communication to the processor module. The photodiodes corresponding to the second optical fibers can also receive analog and/or digital electrical signal data from the processor module, where such analog and/or digital signals represent digital communications data, and convert such analog and/or digital signals to optical digital communications data, and transmit such optical digital communications data to the corresponding second optical fibers. A connector may have one or more first optical fibers for communicating optical energy, and/or one or more second optical fibers for communicating optical digital communications data.

While the method and systems have been disclosed in connection with the illustrated embodiments, various modifications and improvements thereon will become readily apparent to those skilled in the art. For example, the materials can be varied to suit the environments in which the OC 146 can be used. Further, the OC 146 can be utilized for fiber optic connections with systems other than the fuel measurement system described, and may find use for connecting other electro-optical connections. Details of the plug portion 147 and receptacle portion 149 can also be varied to utilize spring-loading and key type fittings in lieu of or in addition to the springs. Although the illustrated OC 146 was shown to be applied to systems according to FIG. 1 that utilize a tank wall processor module 100, for example, the OC 146 can be employed with other processor modules that have at least one power input and at least one data communications input. The photodiodes for data communications and for power can be the same or different photodiodes.

Many additional changes in the details, materials, and arrangement of parts, herein described and illustrated, can be made by those skilled in the art. Accordingly, it will be understood that the following claims are not to be limited to the embodiments disclosed herein, can include practices otherwise than specifically described, and are to be interpreted as broadly as allowed under the law.

What is claimed is:

1. A fiber optic connector, the connector comprising:
   a plug portion having a first end and a second end, where the first end receives at least one of:
     at least one first fiber optic cable providing optical energy, and,
     at least one second fiber optic cable for bi-directional optical data communications,
   a receptacle portion having a first end and a second end, the first end for mating with the second end of the plug portion, and the second end having, at least one first pin corresponding to the at least one first fiber optic cable, and, at least one second pin corresponding to the at least one second fiber optic cable, where the receptacle portion further includes at least one of:
  at least one first photodiode corresponding to the at least one first fiber optic cable for converting the received optical energy to at least one of analog and digital electrical energy for output on the at least one first pin, and,
  at least one second photodiode corresponding to the at least one second fiber optic cable for converting received optical digital communications data to at least one of analog and digital electrical signals for output on the at least one second pin, and
where the at least one first photodiode is associated with a microprocessor with instructions for causing the microprocessor to monitor the optical energy received from the at least one first fiber optic cable.

2. A fiber optic connector according to claim 1, where the at least one second photodiode receives at least one of analog and digital electrical communications signal data as input from the at least one second pin, and converts the received at least one of analog and digital electrical communications data to optical digital communications data for transmission to the at least one second fiber optic cable.

3. An optical connector according to claim 1, where the plug portion includes at least one first ferrule for communicating optical energy from the at least one first fiber optic cable to the at least one first photodiode when the plug portion is mated to the receptacle portion.

4. An optical connector according to claim 3, where the at least one first ferrule includes a first end and a second-end, where the first end is mated to the at least one first fiber optic cable, and the second end is positioned between approximately one and approximately three millimeters from the at least one first photodiode.

5. An optical connector according to claim 3, where the at least one first ferrule includes a first end and a second end, where the first end is mated to the at least one first fiber optic cable, and the second end is positioned to provide a signal distribution based on the at least one first photo diode.

6. An optical connector according to claim 1, where the plug portion includes at least one second ferrule for communicating optical digital communications data from the at least one second fiber optic cable to the at least one second photodiode when the plug portion is mated to the receptacle portion.

7. An optical connector according to claim 6, where the at least one second ferrule includes a first end and a second end, where the first end is mated to the at least one second fiber optic cable, and the second end is positioned between approximately one and approximately three millimeters from the at least one second photodiode.

8. An optical connector according to claim 7, where the at least one second ferrule includes a first end and a second end, where the first end is mated to the at least one second fiber optic cable, and the second end is positioned to provide a signal distribution based on the at least one second photodiode.

9. An optical connector according to claim 1, where the at least one first pin is connected to an electrical power input to a processor module, and the at least one first fiber optic cable is connected to at least one laser power diode.

10. An optical connector according to claim 1, where the at least one second pin is connected to an electrical data communications input to a processor module, and the at least one second fiber optic cable is connected to an optical communications network.

11. An optical connector according to claim 10, where the optical communications network employs at least one of an Ethernet and a Fieldbus protocol.

12. An optical connector according to claim 10, where the processor module is connected to at least two second processor modules in a daisy chain using the at least one second fiber optic cables.

13. A fiber optic connector, the connector comprising:
  a plug portion having a first end and a second end, where the first end receives at least one of:
    at least one first fiber optic cable providing optical energy, and,
    at least one second fiber optic cable for bi-directional optical data communications,
  a receptacle portion having a first end and a second end, the first end for mating with the second end of the plug portion, and the second end having, at least one first pin corresponding to the at least one first fiber optic cable, and, at least one second pin corresponding to the at least one second fiber optic cable,
  where the receptacle portion further includes at least one of:
    at least one first photodiode corresponding to the at least one first fiber optic cable for converting the received optical energy to at least one of analog and digital electrical energy for output on the at least one first pin, and,
    at least one second photodiode corresponding to the at least one second fiber optic cable for converting received optical digital communications data to at least one of analog and digital electrical signals for output on the at least one second pin, and
  where the at least one second photodiode is associated with a microprocessor having instructions for causing the microprocessor to convert the optical data communications received from the at least one second fiber optic cable to digital electrical data communications.

* * * * *